United States Patent Office 3,708,456
Patented Jan. 2, 1973

3,708,456
POLYCONDENSATE REINFORCEMENT PROCESS USING AN INTERFACIAL-FORMING TECHNIQUE
John Louis Kardos, University City, Mo., assignor to Monsanto Company, St. Louis, Mo.
No Drawing. Filed Sept. 18, 1970, Ser. No. 73,680
Int. Cl. C08g 51/10
U.S. Cl. 260—37 N                    10 Claims

ABSTRACT OF THE DISCLOSURE

The application provides the process of preparing fiber-reinforced condensation polymers which comprises conducting an interfacial polycondensation, without substantial stirring, in the presence of discontinuous, inorganic reinforcing fiber dispersed in the phase through which the interfacial film of polycondensate is withdrawn from the reaction zone.

BACKGROUND OF THE INVENTION

(1) Field of the Invention

Composites comprising condensation polymers reinforced with discontinuous inorganic fiber.

(2) Background of the Invention

In any process of fabricating composite materials filled with discontinuous fibers, the major goals are good dispersion of fiber, controllable orientation, good adhesion of matrix to fiber, and a reasonably high fiber content. In prior art, probably the simplest approach was to blend the discontinuous filler particles directly into the polymer melt, followed by extrusion of the mixture. This is usually untenable for fibrous filler, owing to severe fiber damage during mixing, poor dispersion resulting from clumping of the fibers, and consequent limited volume of insertable filler. In the thermoplastic art, there have been provided moldable capsules wherein a finely divided, particulate material is encased by the resin. See U.S. Pats. Nos. 3,185,589, 3,265,644, 3,256,236 and British Pat. Nos. 859,696 and 929,102. Such capsules consist of individual particles or a bundle of non-bonded fibers upon which a monomer has been addition polymerized. In the case of condensation polymers, capsules consisting of a uniform shell of the polymer deposited on each particle or fiber are disclosed in the D. F. Herman et al. Pat. No. 3,272,897, wherein interfacial polycondensation, with stirring, is conducted between the condensable reactants in the presence of the filler. Although use of the capsules as molding compositions facilitates dispersion of the filler, it does little to assure orientation of a fibrous filler because during flow in molding, each coated fiber or each bundle of adjacent, unbonded fibers becomes randomly disposed.

Polycondensation at the interface of two immiscible liquid solvents, each containing a reactant, which react together to form a polycondensate is well known in the art; and the fact that the art recognizes presence or absence of stirring to be critical in determining the type of product is evident from the two chapter headings of the book "Condensation Polymers" by Paul W. Morgan, Interscience Publishers, New York, 1965, wherein Chapter II, entitled Interfacial Polycondensation without Stirring, begins at page 19, and Chapter III, entitled Interfacial Polycondensation with Stirring, begins at page 65. The procedure without stirring involves the rapid formation, at or near the interface, of a coherent polymer film. When the film is removed from the area of the interface, more polymer film forms at once, and a ribbon or tube of the polymer film may be withdrawn continuously. On the other hand, the procedure with stirring gives a polymer product which is granular or powdery. Since one of the problems relating to the use of discontinuous fiber in polymer composites has been provision for adequate dispersion of the fiber, the stirring procedure would appear to be preferred. However, as pointed out in connection with the above-mentioned Herman et al. patent, this method does not serve to orient the fiber. All that is obtained is encapsulation of the fiber within a grain. We have found, surprisingly, that very good dispersion of the fiber is obtained when the film-forming non-stirring method is used, provided that the fiber is present in the phase through which the film is withdrawn. This is probably due to eddy currents which are set up by the withdrawing film. The currents serve not only to disperse the fibers but also to inject them into the polymer film as it is formed. Withdrawal of the film orients the occluded fiber along the withdrawal direction of the film.

SUMMARY OF THE INVENTION

I have found that when an interfacial polycondensation is conducted without substantial stirring to form at or near the interface a coherent polymer film which is continuously withdrawn from the interface area as it is formed to give an elongated body of the polymer, the presence of discontinuous fiber in the phase through which the film is withdrawn results in the formation of an elongated body of said polymer having the fiber occluded therein in a substantially oriented array along the length of the body. The invention thus provides for one-step insertion of discontinuous, reinforcing fibers into condensation polymer matrices to obtain not only good dispersion of the fibers and reasonably high fiber loadings, but also orientation of the fiber. The presently provided process takes place under ordinary atmospheric conditions and results in essentially no damage to the fiber.

The invention is applicable to the production of fiber reinforced polycondensates generally. By polycondensates are meant high molecular weight polymers prepared by a condensation rather than an addition reaction, e.g. polyamides which may be formed by the condensation of a di- or polycarboxylic acid, halide, or anhydride and a di- or polyamine; polyurethanes which may be formed by the condensation of a diisocyanate and a compound having a molecular weight of from about 500–5000 and at least two reactive hydrogen atoms; the polyesters which may be the linear condensation products of polyhydric alcohols with alpha, beta-unsaturated polycarboxylic acids or cross-linked polymers obtained by reacting the linear condensates with a compound containing the vinyl or vinylidene group; the polyureas which may be formed by the condensation of phosgene and a diamine; the polysulfonamides and the polyphosphonamides which may be prepared from a disulfonic or a diphosphonic acid compound and a diamine; the polycarbonates which may be prepared from dihydric aromatic alcohols and phosgene or bischloroformate, etc.

The pairs of intermediates, e.g., a diacyl dihalide plus a diamine as in the case of polyamide preparation, are dissolved in solvents which are preferably mutually immiscible and which are non-solvents for the condensation polymer. The discontinuous, reinforcing filler fiber may be present in either solution, provided that the formed polymer film is withdrawn through the fiber-containing solution. Conveniently, in order to permit withdrawal of the film from the top of the reactor, the fiber is present in the top layer of the phases formed by the mutually immiscible solvents. Almost immediately upon contact of one reactant solution with the other reactant solution a film of the polycondensate appears at the interface of the two phases. The film is tough enough to be lifted out with tongs and removed from the reactor through the fiber-containing phase. As the film is removed, more of it is formed at the interface, and the current eddies set up by the withdrawal suffice to keep the fibers dispersed. Consequently no externally introduced agitation is necessary. The fibers are occluded within the film as it is formed and withdrawn. Withdrawal of the film orients the occluded fiber along the withdrawal direction of the film. Thereby a fiber-reinforced film, or collapsed sheet, or tube of the polycondensate is obtained continuously, so long as sufficient reactants and filler are present in the reactor. As in the case of interfacial polycondensations, generally, the quantity of reactants present need not be calculated exactly. An excess of either may be used, since any excess of one over the quantity of the other simply remains unreacted and does not interfere with the course of the polycondensation. Economically of course, it will be advantageous to use the reactants in substantially stoichiometric proportions.

Preferably, the solvents in which the reactants are dissolved are immiscible, and any two immiscible solvents for the reactants which are substantially non-solvents for the polycondensate are useful. When one of the reactants is water-soluble, water is a convenient solvent for that reactant, even though the other reactant may be attacked rather than merely dissolved by water. Although it is preferred that the solvents be immiscible, in order to permit formation of an interface even without presence of the polymer film, a common solvent or two miscible solvents may be used for the pair of reactants. However, this requires careful operation to assure formation of the film before substantial mixing of the two reactants can occur. After the film has been formed, it serves to separate the reactants.

Polycondensation reactions generally involve the formation of a by-product. In the case of polyamide preparation, for example, reaction of a diamine with an acyl dihalide will involve liberation of hydrogen chloride. An extraneous basic material may be included in the diamine solution; however, the diamine may be used in excess for hydrogen chloride absorption, and the resulting diamine hydrochloride regenerated.

The concentration of reactants present in solution may be widely varied, since the solvents serve merely as inert diluents. Concentrations of as low as 0.1% or even lower may be used; on the other hand, there may be employed concentrations of either reactant which are as high as say, from 20% to 25%, depending upon the solubility characteristics of the reactant. For maximum high molecular weight, concentrations of from, say 1% to 15% by weight are preferred.

The concentration of fiber present will depend upon the extent of loading desired in the final product. Because gravity and eddy currents set up in the dispersion of fibers upon withdrawal of the polymer film force the fiber into the polymer as it is formed, the concentration of fiber in the polymer may be considerably higher than it is in the dispersion. However, the volume fraction of fiber in the composite does increase with increase of fiber concentration in the dispersion. Depending upon the quantity present in the dispersion, fiber filler volume fraction of the composite will be from say, about 1% to 40% or more.

The invention provides for incorporation of any inorganic discontinuous reinforcing fiber; e.g., glass, asbestos, steel, etc. The invention is particularly useful in that it provides for easy incorporation and orientation of the whisker-type fibers, e.g., silicon nitride or silicon carbide into the polycondensates.

The present process may be operated batchwise or continuously. In batch operation, a solution of one reactant is simply contacted with a solution of the other reactant in which the fiber is dispersed, and the almost immediately formed film is pulled away from the interface through the fiber-containing phase. Withdrawal of the film is continued until at least one of the reactants or the fiber is depleted. Continuous operation simply involves addition of fresh reactants and filler as they are consumed.

The composite film, either in sheet or rope or collaped tube form, is useful directly for a variety of industrial purposes in applications where tough plastic products of this shape are desired. However, the withdrawn sheet or rope-like structure may be used for the manufacture of laminated structures, e.g., by compression of a plurality of the sheets, or by winding of the elongated body on a mandrel as in filament winding and subsequent compression. An important use of the collapsed tube or rope is for the fabrication of moldable pellets by chopping.

DESCRIPTION OF THE PRFERRED EMBODIMENTS

The presently provided process combines the phenomena of interfacial polymerization and subsequent flow of the polymer and solvent to provide one-step incorporation of discontinuous inorganic reinforcing fiber into a condensation polymer matrix under conditions of controlled filler orientation, dispersion and volume loading. Any monomer system capable of rapid, interfacial polycondensation can be used provided that reaction of the monomers occurs without substantial stirring of the two phases, so that a polymer film, rather than granular polymer is formed. While the monomer system may comprise any two or more diluted monomers, the preferable components are solutions of one of a pair of rapidly reacting monomers in a first solvent and the other of said pair in a second solvent which is substantially immiscible with the first solvent. By rapidly reacting monomer is meant any organic compound capable of participating in an interfacial polycondensation. Such monomers are well known in the art. See for example the articles by E. L. Wittbecker and P. W. Morgan, Journal of Polymer Science, 40, 299 (1959); the hereinbefore mentioned Morgan book; and the following U.S. Pats.: 2,708,617, 2,813,775–6, 2,949,440, 2,996,482, 3,143,527, 3,206,438, 2,831,834 and 2,816,879. The process is applicable to the polycondensation of substantially any bifunctional intermediates. Presently preferred pairs of reactants include diacyl halides, diisocyanates, diisothiocyanates, dinitriles or bischloroformates as one of the reactants and as the second reactant a diamine, a dihydroxy compound or dithiol or an alkali metal salt thereof; therefrom, depending upon the individual reactants there are obtained polyamides, polyurethanes, polyureas, or polyesters. Because interfacial polycondensation has been so widely studied and reported, it is believed unnecessary to now list the numerous reactants which are known to under go the reaction. However, examples of some of the diacyl dihalides which are presently preferred for the preparation of fiber reinforced polyamides or polyesters are dicarboxylic halides of the formula

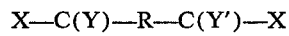

wherein X is halogen, wherein Y and Y' are oxygen or sulfur and R is either absent as in oxalyl chloride or is a hydrocarbon radical of from 1 to 11 carbon atoms; e.g., sebacoyl chloride, adipoyl chloride, dithioladipoyl chloride, terephthaloyl bromide, fumaryl chloride, 1,6-hexanedicarboxylyl chloride, 1,11-undecanedicarboxylyl iodide, cyclohexane-1,4-dicarboxylyl chloride, 1,4-biphenyldicarboxylyl bromide, p-phenylene-bis(thiolacetyl chloride), etc.

Similarly useful are the disulfonyl halides of the formula

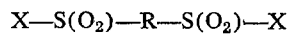

wherein X and R are as defined above, e.g., 1,3-propanedisulfonyl chloride,
1,4-benzenedisulfonyl bromide,
1,8-naphthalenedisulfonyl chloride,
1,5-pentenedisulfonyl iodide,
1,8-tetralindisulfonyl chloride, etc.

The dicarboxylyl or disulfonyl halides react with diamines generally to give polyamides. Polyesters are formed by reacting said halides with diols, dithiols or hydroxy thiols, and preferably with the alkali metal salts thereof, i.e., the sodium, potassium or lithium phenoxides or alkoxides.

For reaction of the acyl halides to give polyamides, diamines having the following formula are preferred:

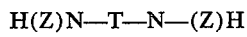

wherein Z is hydrogen or alkyl of 1 to 5 carbon atoms and T is bivalent hydrocarbon, hydrocarbyloxyhydrocarbyl, hydrocarbylthio (or sulfonyl) hydrocarbyl or hydrocarbylketohydrocarbyl of from 1 to 18 carbon atoms and free of non-benzenoid unsaturation, e.g., 1,4-cyclohexanediamine,
hexamethylenediamine,
N,N'-dipentyl-1,4-butanediamine,
p-phenylenediamine,
N,N'-diisobutylhexamethylenediamine,
4,4-methylenedianiline,
1,5-naphthalenediamine,
4,4'-methylenedi-o-toluidine,
hexahydro-p-xylylenediamine,
1,6-diaminobiphenyl,
1,4-bis(3-aminopropoxy)benzene,
4,4'-diaminophenyl ether,
bis(4-butylamino) sulfide,
4,4'-diaminodiphenyl sulfone,
4,4-diaminobenzophenone, etc. Also useful are heterocyclic diamines such as piperazine and the nuclearly alkylated piperazines, e.g., 2,5-dimethylpiperazine, 2-butylpiperazine, etc.

For reaction of the diacyl halides to give polyesters, there are employed diols, dithiols, hydroxy thiols or alkali metal salts thereof having the formula

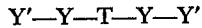

wherein Y is oxygen or sulfur, Y' is hydrogen or alkali metal, and T is as defined above in the diamine formula. Examples of such compounds are bisphenols such as resorcinol,
hydroquinone,
4,4'-dihydroxybiphenyl,
1,6-dihydroxynaphthalene,
bis(4-hydroxyphenylmethane),
2,2-bis(4-hydroxyphenyl)propane,
1,1-bis(4-hydroxyphenyl)dicyclohexylmethane,
bis(4-hydroxyphenyl)sulfone,
1,8-bis(4-hydroxybenzoyl)octane,
bis(4-hydroxyphenyl)

sulfide or ether, and the sodium, potassium, lithium or rubidium phenoxides thereof; the dithiols such as p-phenyldithiol and its alkali metal salts; the alkylene glycols and the alkylene dithiols such as ethylene glycol, hexamethylene glycol, tetramethylenedithiol or diethylene glycol and the alkali metal alkoxides thereof. The alkali metal phenoxides of the bisphenols are of present major commercial importance.

For preparing the fiber-reinforced polyurethanes by interfacial polycondensation, it is preferred to react a bischloroformate with a diamine. Advantageously the chloroformate is an alkylene or cycloalkylene bischloroformate such as ethylene, trimethylene, tetramethylene, pentamethylene, hexamethylene or 1,4-cyclohexylene bischloroformate. The diamine may be any of the diamines shown above as useful for the preparation of diamides; e.g., fiber reinforced polyurethane films are readily prepared by interfacial polycondensation, in absence of stirring, of a bischloroformate such as dimethyltrimethylene bischloroformate and an amine such as hexamethylenediamine in presence of the fiber. The polyurethanes may also be prepared by interfacial polycondensation of said diamines with diisocyanates in presence of the discontinuous fiber; e.g., by reaction of a benzene solution of hexamethylene diisocyanate or of 2,4-toluylene diisocyanate with aqueous hexamethylenediamine containing the fiber.

The present process is likewise suitable for the preparation of fiber reinforced polycarbonates by reaction of a bis(chloroformate) with a diol or dithiol in the presence of the fiber. The hydroxy compound or the dithiol may be any of those which are commonly employed for the preparation of polyesters. The bisphenols, e.g., 2,2-bis(4-hydroxyphenyl)propane, are preferred. Conveniently, also, the chloroformate may be that of the diol reactant. Thus, a filled polycarbonate is prepared by adding a solution of, say, bis(hydroxyphenyl)methane together with sodium hydroxide as acid acceptor, asbestos fiber as filler and a quaternary ammonium compound as dispersant added to a solution of the chloroformate of the same hydroxy compound to obtain at the resulting interface a film of polycarbonate wherein the fiber is occluded in substantially parallel array. The filled polycarbonates can also be produced by reaction of phosgene with the diols or dithiols; advantageously, by a continuous process, phosgene is added during the reaction to a solvent therefor while a film of the filled polycarbonate is continuously removed from the interface formed by the phosgene solvent and another solution which is being constantly replenished with the diol or dithiol and fiber filler.

The nature of the individual solvents which are employed in the present process will vary, of course, with the nature of the reactants. The respective solvents for a pair of reactants are preferably mutually immiscible. In prior art relating to interfacial polycondensations, water has been generally employed, if at all possible, as a solvent for one of the reactants; an organic solvent has been used for the other reactant. In polyamide formation, the organic solvents of choice have been the chlorinated alkanes, e.g., carbon tetrachloride, dichloromethane and tetrachloroethylene. Frequently, the solubility of a reactant, particularly in water, is influenced by the presence of an acid acceptor. For example, although most bisphenols possess low water-solubility, addition of an alkali hydroxide or other strongly basic compound serves to solubilize the reactant while at the same time it tends to activate the reaction by consuming the acid by-product in such polycondensations as those involving evolution of, say, hydrogen halide in reactions involving the use of acyl halides or the haloformates. Addition of quarternary ammonium salts to an aqueous phase is often used to accelerate polycondensations which involve the acyl halides; and such salts sometimes serve as accelerators when added to organic solutions in reactions where acyl halides are not used.

In order to obtain high molecular weight polycondensates, the concentration of reactant in its solvent advantageously is from about 1% to about 25% by weight, and preferably from about 3% to 15% by weight. An excess of either reactant above that required stoichiometrically may be present, since any unreacted material does not affect the course of the reaction, so long as proper reactant distribution is maintained by employing the reactants within the concentration limits set forth above.

For maximum film strength of the polycondensate it is preferred to work with solvent systems which do not attack the polymer as it is formed. Hence the solvents should not only dissolve the respective reactants present therein and be immiscible with respect to each other, but they are preferably non-solvents for the polymer product.

The preferred fibers for use in this invention are any discontinuous, inorganic fibers having a reinforcing effect when present in the polycondensate. They may be ceramic or metallic, depending upon the intended use of the finished articles. For proper dispersion and orientation in the film, they are preferably short fibers, e.g., they will be from, say, 0.01" to 0.5", and preferably from about 0.03" to 0.3", in length. Preferably, the fiber will have an aspect ratio of from about 50 to 1500, although, depending upon the nature of the fiber the diameter may be lower or greater than that required by such a range. In selecting the most suitable ratio within these limits it is desirable to consider the stiffness of the contemplated reinforcing fiber, since materials of high flexibility should be thick enough to maintain a degree of rigidity in the liquid media of the reaction mixture. Likewise, materials of great rigidity should be thin enough to permit aligning by flow of the polymer.

Glass fibers, being readily available and imparting very good tensile and flexural properties to composite structures, are generally useful; for purposes of comparison most of the following examples show the use of glass fibers. However, from the standpoint of simultaneous mechanical strength and thermal resistance, particularly useful are filaments of boron, graphite, niobium, tantalum, hafnium, tungsten, molybdenum, bronze, copper, lead, silver, stainless steel, silica, silicon nitride, alumina, sapphire, zirconia, titania, etc. Any of the high-strength fibers listed in the table at p. 134 of the book "Fiber Composite Materials," published by the American Society for Metals, Metals Park, Ohio, 1965, are presently useful. Naturally occurring fibers such as the comparatively long asbestos fibers, e.g., Crocidolite, are also useful. Examples of presently commercially available fibers which are advantageously employed as reinforcing agents are the milled alumina-silica fibers of the type supplied under the name "Fiberfax 100," the potassium titanate fibers of the type supplied under the name "Tipersul," the "Thornel" graphite fibers, etc.

The fiber may be added either before or during the polymerization to either of the two monomer-solvent phases, provided that the phase to which the fiber is added is that through which the polycondensate film is withdrawn from the reaction vessel. Conveniently, the film is removed from the top of the vessel. In that case, the fiber is added to the lighter phase. Adequate surface tension exists at the interface to prevent penetration of the fiber into the denser phase.

The concentration of the fiber in the reacting solution will depend upon the kind and size of fiber as well as upon the quantity of reinforcing agent desired in the polycondensate. Generally, all that is required is that the fiber be available at or near the interface. In batch operation the fiber is added to the desired reactant solution and well stirred in order to disperse it. Conveniently, ultrasonic stirring serves the purpose, but any means of suspending the fiber may be employed. Generally, mechanical means suffice, i.e., a dispersing or suspending agent is unnecessary, for once the suspension of fibers has been added to the solution of the complementary reactant and removal of the almost immediately formed polycondensate film is initiated, eddy currents set up by withdrawal of the film serve to maintain suspension of the fiber and to propel the fiber to the polymerization site for incorporation into the film as it is formed. The comparative build-up of fiber concentration in the zone of polymerization thus generally results in a polymer product having a concentration of fiber which is greater than that present in the freshly prepared fiber-containing reaction solution. The size, density and even flexibility of the fiber will, of course, affect somewhat the degree to which it is influenced by the current and hence the quantity of fiber in the film and extent of orientation. Although in any event some oriented fiber will be present in the withdrawn film, it is recommended that with each new type and size of fiber an experimental run be made in order to determine the concentration of fiber in the solution which will give the desired concentration in the film. Irrespective of the type of fiber, the concentration of fiber occluded in the film increases with increases in fiber content of the solution. Hence the fiber content of the solution may be very low, say, as low as 0.01% or even less by weight. The maximum fiber content in the reaction solution will be that quantity which will not settle and prevent reaction or which will not agglomerate in spite of the eddy currents or other means of dispersion of polycondensate film at the interface. Generally, concentrations of fiber in a quantity of say, from 0.01% to 2%, and, preferably, of from 0.05% to 1% by weight of the solution will be found to give good fiber-containing polycondensate films.

In continuous operation, fiber is added continuously to the layer of reactant solution through which the film is withdrawn, addition being metered to maintain substantially the concentration determined to be advantageous in batch operation.

Because production of polymer film by interfacial polycondensation involves formation of more film as the film is withdrawn from the interface, the process is particularly adapted to continuous operation. This is especially true in the present instance, where the rate of fiber consumption is generally greater than that at which the reactant-containing solutions are consumed. Continuous operation allows addition of the fiber at the rate at which it is used. It also makes possible the use of large quantities of fiber without having to consider the possibility of fiber settling and interfering with the polymerization as in the case of batch runs.

In either batch or continuous operation, withdrawal of the film as it is formed permits the formation of new film. As is known in the prior art of interfacial polycondensations without stirring, the rate of withdrawal will somewhat affect the degree of polymerization in the case of some reactants. To ascertain the optimum withdrawal rate for any set of reactants is a matter of easy, routine experimentation and well within the purview of those skilled in the art. Insofar as the present process is concerned, withdrawal rate has very little effect on the quantity of fiber incorporated into the film; thus, tripling the withdrawal rate (whereby more vigorous eddy currents could be expected) may raise the volume concentration of fiber in the film product by only a few percent.

The shape of the film product obtained by interfacial polycondensation without stirring is known in prior art to depend somewhat upon the manner in which the film is removed from the reaction vessel and on the shape of the vessel. When the freshly formed film is grasped from the center of a circular interface, the product will form a tube as it is removed. Depending upon the nature of the polycondensate, including the degree of polymerization, the tube-like structure collapses to give a ribbon or tape or even a solid rod. These phenomena are not substantially affected by the presence of the discontinuous fibers occluded therein according to the present process. Also, as in the prior art, flat films or sheets may be withdrawn by removing the polymer film at a side of a rectangular interface, when a rectangular vessel is employed.

As the polymer product is withdrawn from the interface, it is advantageously passed through a bath in order to quench it and wash it. A water bath or an alcohol/water bath generally suffices. The quenched film can then be conveniently collected on, say, a reel.

The reinforced polycondensates provided by the present process when operating in a circular reactor are generally rod-like or rope-like in character. The fiber content thereof is oriented along the length of the withdrawn product, which is generally tough and tenacious. The rods or ropes may be woven into furniture components and employed also for cording. They may also be positioned on a mandrel for molding into pipes and other structures by filament winding techniques. The exiting collapsed film may be solvent-drawn or dried and then hot- or cold-drawn to produce drawn reinforced filaments.

A most important utility of the presently provided rod or rope-like structures is for preparation of molding compounds containing the reinforcing fiber in parallel orientation. They are simply cut across the diameter thereof to give pellets of a size suitable for, say, transfer or injection molding processes. Flat sheets obtainable by the present process are useful as membranes or for diaphragms, say, in electrolytic processes wherein the filler serves not only as reinforcement but also as electric conductor, say, in the case of a nylon film having graphite fiber occluded therein for use as a diaphragm in a hydrogen/oxygen fuel cell.

The invention is further illustrated by, but not limited to, the following examples:

EXAMPLE 1

In a 600 ml. cylindrical vessel 3 ml. of adipoyl chloride was dissolved in 100 ml. of tetrachloroethylene. In another vessel, 4.4 g. of hexamethylenediamine was added to aqueous sodium carbonate solution (100 ml. $H_2O$ containing 8 g. $Na_2CO_3$); and 0.5 g. of E-glass fibers, 4 mils in diameter and about 0.05" in length, were ultrasonically dispersed in the resulting solution. The dispersion was poured, at room temperature, into the vessel of adipoyl chloride solution, care being taken to disturb the resulting interface as little as possible, the dispersion becoming the upper, lighter phase, and a polymer film forming almost immediately at the interface. Tweezers were inserted through the upper, water solution to reach and draw out the film which continued to form at the interface. As the polymer film was withdrawn, it flowed from the sides of the vessel toward the center, thus setting up an inverted, funnel-type flow. The glass fibers were oriented and concentrated into a fibrous tube of film, owing to upward flow of fiber plus polymer and some solvent. As the tube was withdrawn, wake eddies were set up in the upper layer; these serve to keep the remaining fibers stirred and dispersed. The exiting tube of filled polymer was passed over a pulley arrangement through a water/ethanol wash and collected on a take-up drum, where it was collapsed at very slow withdrawal rates. Examination of the dried tube showed a fiber loading of 20 volume percent. The fibers were well-oriented and dispersed, with no noticeable fiber damage.

EXAMPLE 2

This example shows incorporation of varying quantities of fiber glass into nylon by an interfacial polymerization procedure. The following polymerization recipe was used, for five runs, wherein E-glass fiber, 0.05" in length, was used in the concentrations shown below:

Aqueous phase, top layer

| | |
|---|---|
| Aqueous hexamethylenediamine, 69 wt. percent ____ml__ | 6.4 |
| Distilled water ____ml__ | 100.0 |
| Anhydrous sodium carbonate ____g__ | 8.0 |
| Glass fiber: | |
| Run 1 ____g__ | 0.1 |
| Run 2 ____g__ | 0.2 |
| Run 3 ____g__ | 0.3 |
| Run 4 ____g__ | 0.4 |
| Run 5 ____g__ | 0.5 |

Organic phase, bottom layer

| | Ml. |
|---|---|
| Tetrachloroethylene | 100.0 |
| Adipoyl chloride | 3.0 |

The organic and aqueous charges of raw materials were prepared in 800 ml. beakers having a diameter of 105 mm. The glass fiber was ultrasonically dispersed in the aqueous phase and the dispersion was allowed to cool to room temperature before being carefully poured into the 800 ml. beaker containing the organic phase. The polymer film which immediately forms at the resulting liquid interface allowed to solidify for one minute before being grasped with a pair of tweezers and raised over a ball bearing mounted roller as a continuously forming rope of glass reinforced nylon. The rope was guided under two rods through a water/ethanol wash bath, dried by a warm air blower, and wound on a motor-driven reel at a wind up speed of 9.45 feet per minute. Burn-offs of 2 foot long samples taken at the middle of each run were made by heating in a muffle furnace at 1300° F. for 8 hours to obtain the fiber glass concentration of product from each run. The following results were obtained:

| Run No.: | Vol. percent of glass in sample |
|---|---|
| 1 | 3.24 |
| 2 | 7.39 |
| 3 | 9.89 |
| 4 | 12.36 |
| 5 | 14.14 |

The above data show that the volume percent of glass in the product increases nearly linearly with increases in the amount of glass introduced.

EXAMPLE 3

In this example, the effect of withdrawal rate on the filler content of the polymer composite was studied. Operating as in Example 2, but employing the same quantity of glass fiber in each of two runs, the composite rope was wound up on the reel at a wind-up speed of 9.45 feet/minute in one run and at the rate of 24.40 feet/minute in another run. The volume percent of the glass in the sample from the low speed run was determined to be 6.31, whereas that of the sample from the high speed run was 7.85. Thus, withdrawal at a speed which is almost triple that of 9.45 feet/minute speed results in only very slight increase in glass content. This increase probably stems from better dispersion of glass throughout the aqueous phase due to increased fluid motion about the rapidly exiting composite.

EXAMPLE 4

The manufacture of fiber-reinforced condensation polymer by interfacial polymerization can be readily conducted as a continuous flow method. Advantageously, in such operation, each of the reaction components and the fiber are fed to the polymerization reactor at the rate at which they are consumed. An example of a continuous run is as follows:

The batch polymerization recipe of Example 2 is introduced into the reactor and production of polymer film is started as described in that example. Fresh reactants and filler are then fed to the reactor at flow rates based on overall mass balances, aqueous hexamethylenediamine and aqueous sodium carbonate being respectively added through side inlets of the reactor to arrive in the upper, aqueous phase and the tetrachloroethylene solution being added at a bottom inlet to arrive in the lower, organic phase. Preferably, the filler is added separately, in the dry state, by sprinkling it on the surface of the aqueous phase. For replenishing the Example 2 batch run, liquid make-up is metered from storage tanks of the following:

(1) Hexamethylenediamine, aqueous solution: 69 wt. percent
(2) Sodium carbonate, 1.5 M aqueous solution
(3) Water
(4) Tetrachloroethylene
(5) Adipoyl chloride The storage tanks were placed under a common nitrogen head of 10 p.s.ig.

At a withdrawal rate of 9.45 feet/minute, which is the rate at which the composite rope of filled polymer film was removed from the reactor, the steady state flow rates of the above liquids from their storage tanks were determined to be as follows:

| Liquid No.: | Flow rate, cc./min. |
| --- | --- |
| 1 | 0.85 |
| 2 | 7.00 |
| 3 | 6.65 |
| 4 | 13.10 |
| 5 | 0.40 |

The components of the organic phase, i.e., the adipoyl chloride and the tetrachloroethylene are premixed by metering with a rotameter at the required flow rate into a vessel in which the combined streams are vigorously stirred in order to remove the nitrogen which may have dissolved therein owing to storage under nitrogen pressure. The evolved gas and any water vapor are swept out of the mixing vessel by means of a strong nitrogen gas stream. The organic phase is fed from the mixing vessel through a bottom inlet tube of the polymerization reactor, using a fine, stainless steel needle valve set for the required feed rate of 13.5 ml./minute.

The aqueous sodium carbonate feed is diluted to the 0.75 molal solution required in the polymerization recipe by in-line mixing with the water feed before entering through a side inlet of the polymerization reactor to the upper aqueous phase. The hexamethylenediamine is fed directly to the aqueous phase.

The glass fiber filler is introduced as a separate, dry stream to the top of the reactor. This is conveniently conducted by vibrating agglomerated balls (less than about 2 mm. in diameter) of short E-glass fiber from a feed hopper through a wire mesh (1.75 mm. square grid) onto a motor driven conveyor belt from which they are dislodged by gravity at a rate of about one gram per minute over the side of the reactor. Adjustment of the glass storage vessel vibrator thus provides for introduction of a slow steady stream of the fiber into the aqueous phase. Falling directly into said phase, the fibers are sheared and dispersed by eddy currents set up by the withdrawing polymer rope. Surface tension set up by the polymer film at the interface is sufficient to contain the fibers in the aqueous phase.

The fiber may also be introduced by feeding it circumferentially into the aqueous phase from a trough running around the top of the reactor.

Operating as described above, there was obtained a strong rope of reinforced nylon having a glass fiber content of 30 volume percent. Microscopic examination of the product showed substantial orientation of the fiber along the length of the rope.

EXAMPLE 5

This example describes preparation of a graphite fiber-reinforced polyester composite by interfacial polymerization. For the organic phase, 29.5 g. of 4,4'-oxydibenzoyl chloride and 0.5 g. of triethylbenzylammonium chloride were added to 100 ml. of dichloromethane. The aqueous phase was made up of 22.8 g. of 2,2-bis(4-hydroxyphenyl) propane, 8 g. of sodium hydroxide and 200 ml. water and 1 g. of chopped graphite fiber of 0.05" length, the latter having been ultrasonically dispersed in the liquid mixture of the aqueous phase components. The interface was formed by careful introduction of the different phases to each other, and the almost immediately produced composite tube of filled polymer was withdrawn, washed by passing through an alcohol bath, and dried. The dry, collapsed tube, containing 35 volume percent of oriented, dispersed graphite fibers, was then chopped into ⅜" lengths for use in standard molding techniques.

EXAMPLE 6

The organic and aqueous phase may be alternated to produce tubes having differing, concentric polymer makeup. To obtain such a structure the following experiment was conducted.

To a reactor which had been charged with 20 ml. of carbon tetrachloride and one ml. of sebacoyl chloride, there was slowly added a dispersion of 0.25 g. of alpha-silicon carbide whiskers in 30 ml. of 2.5 percent aqueous hexamethylenediamine solution containing two equivalents of sodium hydroxide. The resulting polymer film was pulled and held at a tube while a third layer consisting of one ml. of adipoyl chloride in 20 ml. of xylene was added. The rope was then withdrawn through the third layer at a rate of 7 feet/minute to give a composite tube structure wherein the silicon carbide whiskers were present in oriented disposition in each of the two different concentric polymer films along the length of the rope. The tube geometry was maintained by heating gently to fuse the two layers. Analysis for fiber content by burn-out of the organic matter showed a 30 percent by volume content of the silicon carbide whiskers.

EXAMPLE 7

A reinforced polyurethane tape was made by employing in the interfacial polymerization procedure an organic phase consisting of a mixture of 8.6 g. tetramethylenebischloroformate and for the aqueous phase a dispersion of 0.5 g. of alumina whiskers in a solution consisting of 3.5 g. of tetramethylenediamine and 6.4 g. of sodium carbonate in 100 ml. of water. After forming the interface, the resulting film was withdrawn as a tube at a rate of 15 feet/minute, and allowed to collapse to form a reinforced polyurethane tape wherein the alumina whiskers were oriented along the length thereof. The tape is useful per se as a valuable sealant. It can also be used to form skeleton preforms of the alumina whiskers. For example, before drying, the tape can be wound around a conical mandrel, dried and heated in vacuum to remove the polyurethane to give an integral cone-shaped skeleton of oriented alumina whiskers. Impregnation of the skeleton with high performance epoxy resin and subsequent curing and molding under pressure resulted in a strong, cone-shaped piece.

It is to be understood that although the invention has been described with specific reference to particular embodiments thereof, it is not to be so limited since changes and alternations therein may be made which are within the full intended scope of this invention.

What I claim is:

1. The process of preparing fiber-reinforced condensation polymers which comprises conducting an interfacial polycondensation, without substantial stirring, in the presence of discontinuous, inorganic reinforcing fiber dispersed in the phase through which the interfacial film of polycodnensate is withdrawn from the reaction zone.

2. The process defined in claim 1 further limited in that the polycondensation is that of a pair of polyamide-forming reactants.

3. The process defined in claim 1, further limited in that the fiber is glass.

4. The process defined in claim 1, further limited in that the polycondensation is conducted between a pair of polyamide-forming reactants and the fiber is glass.

5. The process which comprises contacting, without substantial stirring to produce a two-phase system, respective solutions of intermediates which react rapidly with each other to form a polycondensate, the solvents in said solutions being substantially immiscible with each other and being substantially non-solvents of the polycondensate, and one of said solvents having inorganic, discontinuous reinforcing fiber dispersed therein, and withdrawing from the interface through the phase containing said fiber an elongated composite structure comprising a matrix of the polycondensate containing said fiber as reinforcement.

6. The process defined in claim 5 further limited in that the intermediates are polyamide-forming reactants.

7. The process defined in claim 5 further limited in that the fiber is glass.

8. The process defined in claim 5 further limited in that the intermediates are polyamide-forming intermediates and the fiber is glass.

9. The process defined in claim 5 further limited in that the intermediates are polyurethane-forming intermediates and the fiber is alumina whiskers.

10. The process defined in claim 5 further limited in that depleted intermediates and fiber are continuously replenished as the film is withdrawn.

References Cited

UNITED STATES PATENTS

| 2,708,617 | 5/1955 | Magot | 18—54 |
| 2,798,283 | 7/1957 | Magot | 28—82 |
| 2,999,788 | 9/1961 | Morgan | 162—146 |
| 3,078,242 | 2/1963 | Morgan | 260—29.6 |
| 3,419,517 | 12/1968 | Hedrick et al. | 260—37 |
| 2,935,371 | 4/1959 | Magot | 18—54 |
| 2,874,139 | 2/1959 | Symons | 260—37 |

FOREIGN PATENTS

| 618,094 | 10/1946 | Great Britain | 260—37 |

OTHER REFERENCES

Condensation Polymer, P. Morgan, pp. 19–35 and 50–61, 1965.

MORRIS LIEBMAN, Primary Examiner

R. ZAITLEN, Assistant Examiner

U.S. Cl. X.R.

260—41 AG; 264—180, 182, 184